United States Patent
Koo

(10) Patent No.: US 11,615,652 B2
(45) Date of Patent: Mar. 28, 2023

(54) METHOD FOR DIAGNOSING FAILURE OF COLD START EMISSION REDUCTION SYSTEM AND VEHICLE THEREOF

(71) Applicants: Hyundai Motor Company, Seoul (KR); Kia Corporation, Seoul (KR)

(72) Inventor: Bon-Chang Koo, Seongnam-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 208 days.

(21) Appl. No.: 17/232,959

(22) Filed: Apr. 16, 2021

(65) Prior Publication Data

US 2022/0076507 A1 Mar. 10, 2022

(30) Foreign Application Priority Data

Sep. 7, 2020 (KR) .................. 10-2020-0113775

(51) Int. Cl.
*G07C 5/00* (2006.01)
*B60W 30/18* (2012.01)
*G07C 5/08* (2006.01)

(52) U.S. Cl.
CPC ....... *G07C 5/006* (2013.01); *B60W 30/18109* (2013.01); *G07C 5/0808* (2013.01); *B60W 2510/0657* (2013.01)

(58) Field of Classification Search
CPC .............. G07C 5/006; G07C 5/0808; B60W 30/18109; B60W 2510/0657; B60W 30/18009; F02D 37/02; F02D 41/22; F02D 41/0225; F02D 41/08; F02D 2200/021; F02D 2250/22; F02D 41/064; F02D 41/004; F02D 2200/101; F02N 11/10; F02N 19/004; F02P 5/1506; F02P 5/1502; F02M 25/0809
See application file for complete search history.

(56) References Cited

U.S. PATENT DOCUMENTS 7,678,005 B2    3/2010 Tuckfield
9,181,884 B2 * 11/2015 Hashimoto ........... F02D 41/083
9,915,193 B2    3/2018 Casal Kulzer et al.
(Continued)

FOREIGN PATENT DOCUMENTS

| JP | 2010-216419 A | 9/2010 |
|---|---|---|
| KR | 10-2009-0114355 A | 11/2009 |
| KR | 10-2016-0057328 A | 5/2016 |

*Primary Examiner* — Sizo B Vilakazi
(74) *Attorney, Agent, or Firm* — Morgan, Lewis & Bockius LLP

(57) ABSTRACT

A method for diagnosing failure of a cold start E/M reduction system confirms the change in the torque reserve compared to the torque reserve confirmed for the ignition timing upon cold start by any one of an operation of an electric load device, an operation of an alternator, an operation of a purge valve, an operation of an air conditioner, a shift state of a transmission, and a coolant temperature state of an engine, and confirms the failure or normality of any one of the electric load device, the alternator, the purge valve, and the air conditioner is normal or failed using the change in the torque reserve to apply the confirmed result to determine whether the cold start E/M reduction system is abnormal, securing failure diagnosis accuracy for the components for the cold start E/M reduction.

20 Claims, 8 Drawing Sheets

(56) References Cited

U.S. PATENT DOCUMENTS

2012/0253645 A1* 10/2012 Hashimoto ......... F02D 41/0005
                                                                 701/112
2016/0138491 A1    5/2016 Casal Kulzer et al.
2019/0323407 A1* 10/2019 Dimoski ................. F01N 11/00

* cited by examiner

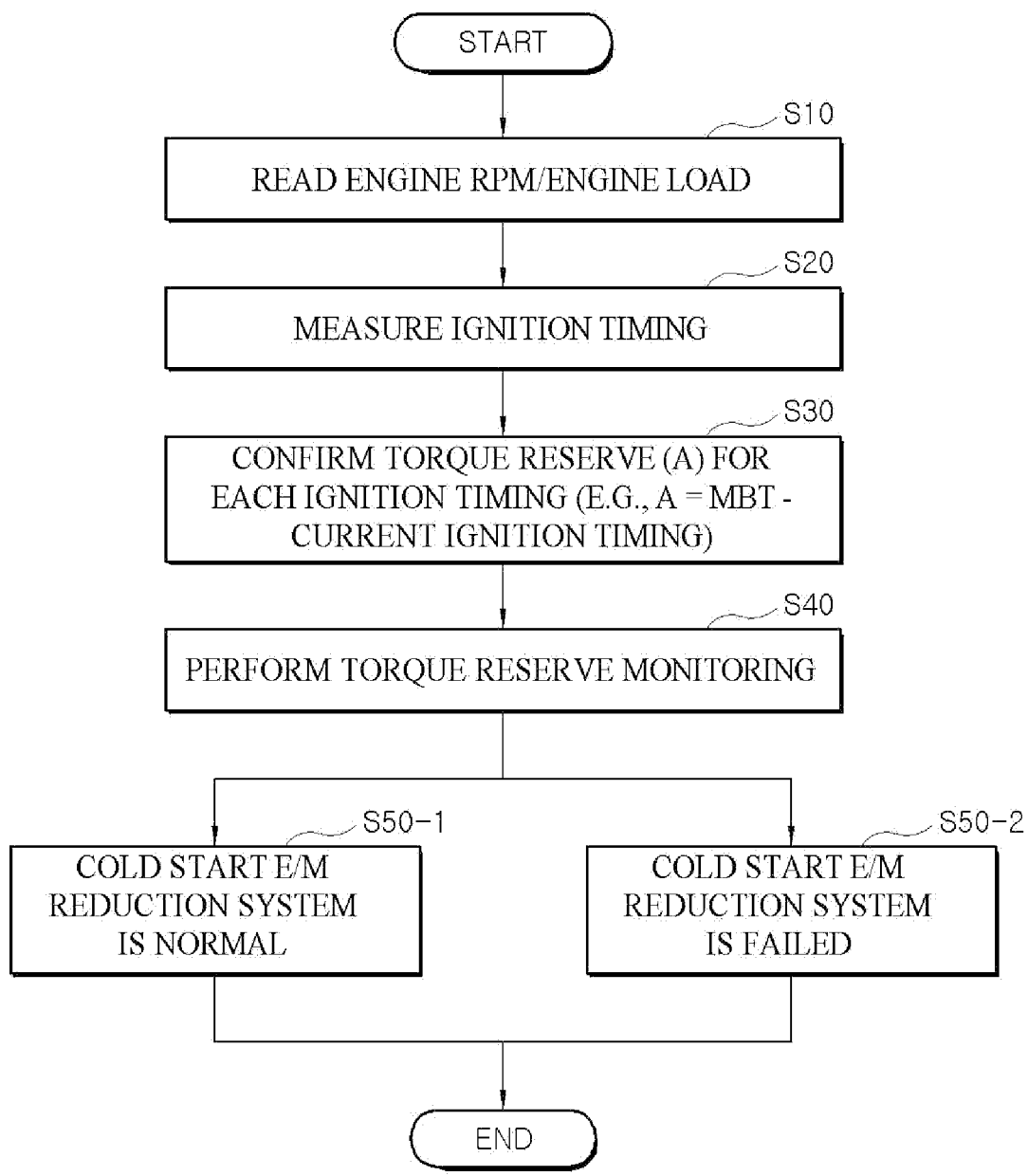

FIG.2A
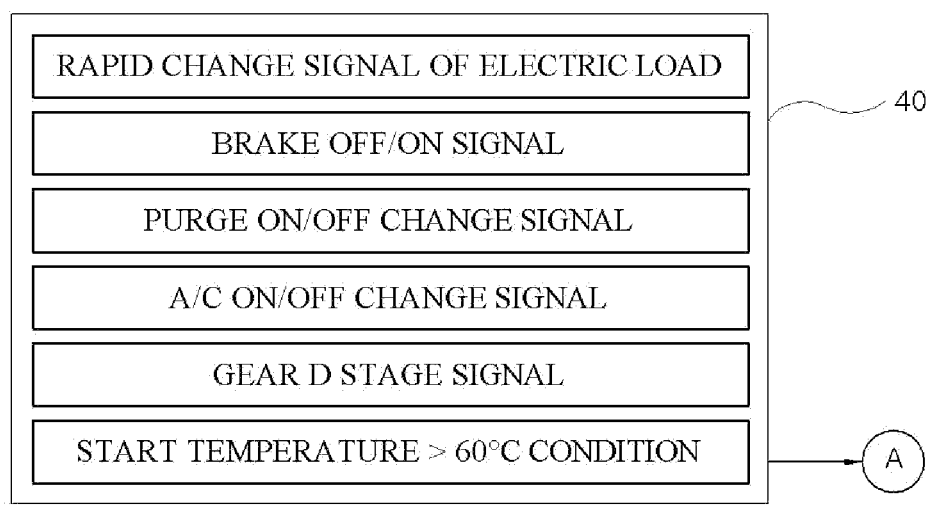
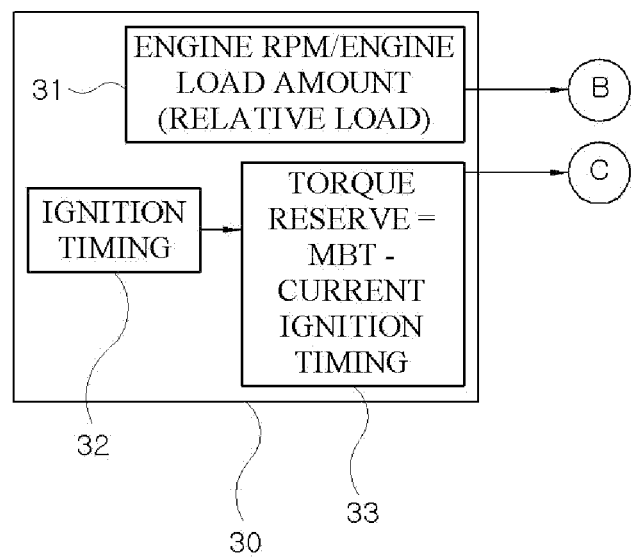

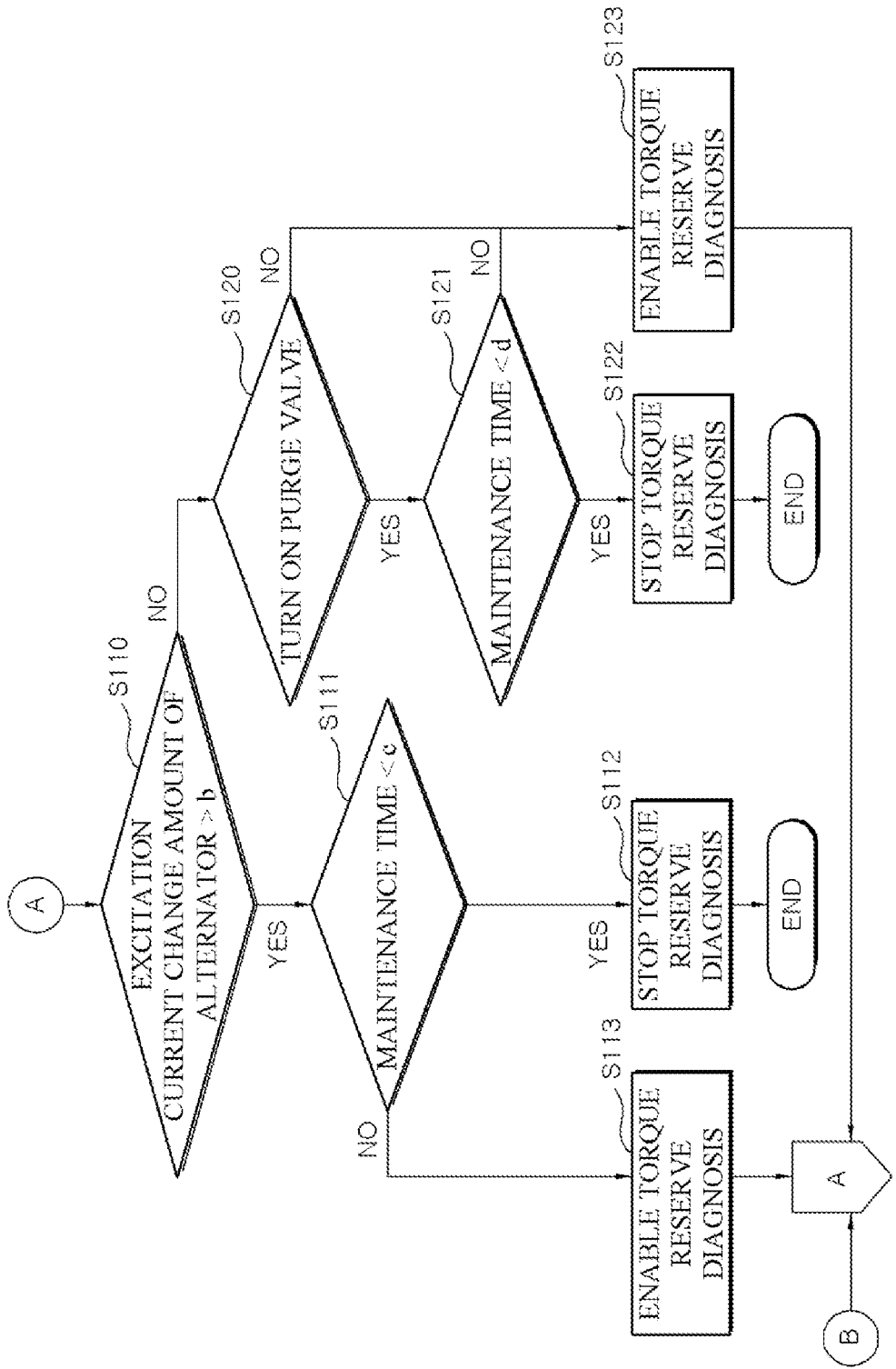

METHOD FOR DIAGNOSING FAILURE OF COLD START EMISSION REDUCTION SYSTEM AND VEHICLE THEREOF

CROSS-REFERENCE TO RELATED APPLICATION

The present application claims priority to Korean Patent Application No. 10-2020-0113775, filed on Sep. 7, 2020, the entire contents of which is incorporated herein for all purposes by this reference.

BACKGROUND OF THE PRESENT INVENTION

Field of the Invention

The present invention relates to a cold start control, and particularly, to a vehicle implementing a cold start emission (E/M) reduction system failure diagnosis by a change in an idle torque reserve due to an operation of an E/M reduction system compared to an idle torque reserve retarded compared to a maximum brake torque (MBT).

Description of Related Art

Since the generation of emission increases upon the cold start of a vehicle, a cold start control for reducing the emission is performed.

As an example, the cold start control performs a cold start system failure diagnosis based on an engine revolutions per minute (RPM), and the cold start system failure diagnosis is performed for an injector for injecting fuel, an ignition plug for combustion, a continuously variable valve timing (CVVT) system for adjusting lead angle/retard angle phase timings of a cam, or the like. Therefore, the cold start control contributes to suppressing an increase in the emission upon cold start through the cold start system failure diagnosis.

However, the cold start system failure diagnosis is a method in which the respective components are connected to each other such that each component is not failed but there is difficulty in diagnosing the occurrence of the failure of the system in which the emission is systematically increased.

The cold start emission reduction (CSER) system failure diagnosis (e.g., North American legislation) is applied as an essential item due to the recently strengthened environmental regulations such that the phenomenon systematically causing an increase in the emission in a state of being not failed is required to be resolved.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a method for diagnosing failure of a cold start E/M reduction system and a vehicle thereof, which determine the occurrence of failure of components for reducing a cold start E/M due to the rapid reduction in the torque reserve retarded compared to a maximum brake torque (MBT), securing diagnosis accuracy, and limit a torque reserve diagnosis condition to a state where there is no occurrence of the turning-off and thus there is no change in the load, preventing the misdiagnosis due to the turning-off causing the rapid reduction in the torque reserve.

A method for diagnosing failure of a cold start E/M reduction system according to various exemplary embodiments of the present invention for achieving the object includes: confirming, by a controller, a torque reserve for an ignition timing upon cold start of an engine; and performing a torque reserve monitoring control which confirms a change in the torque reserve compared to the torque reserve by any one of an operation of an electric load device, an operation of an alternator, an operation of a purge valve, an operation of an air conditioner, a shift state of a transmission, and a coolant temperature state of an engine, and confirms whether any one of the electric load device, the alternator, the purge valve, and the air conditioner is abnormal using the change in the torque reserve.

As various exemplary embodiments of the present invention, the torque reserve is an idle torque ignition timing retarded compared to a maximum brake torque (MBT). The confirming of the ignition timing is performed by confirming an engine RPM and an engine load upon the cold start.

As the exemplary embodiment of the present invention, the performing of the torque reserve monitoring control includes: performing a first system diagnostic control which confirms facilitating a torque reserve diagnosis by operation of any one of the electric load device, the alternator, and the purge valve; performing a second system diagnostic control which confirms facilitating the torque reserve diagnosis by applying any one of an operation of the air conditioner or the shift state and the coolant temperature state; and verifying a change in the torque reserve which confirms the change in the torque reserve by the facilitating of the torque reserve diagnosis, and confirms presence or absence of the abnormality by normality of the cold start E/M reduction system or the failure of the cold start E/M reduction system.

As the exemplary embodiment of the present invention, the performing of the first system diagnostic control includes: diagnosing the electric load device, wherein the diagnosing the electric load device confirms the facilitating of the torque reserve diagnosis by operating the electric load device, and applying a first maintenance time to the operation of the electric load device; diagnosing the alternator, wherein the diagnosing the alternator confirms an excitation current change amount generated by the alternator, and confirms the facilitating of the torque reserve diagnosis by applying a second maintenance time to the excitation current change amount; and diagnosing the purge valve, wherein the diagnosing the purge valve confirms the facilitating of the torque reserve diagnosis by operating the purge valve, and applying a third maintenance time to the operation of the purge valve.

As the exemplary embodiment of the present invention, when each of the first maintenance time, the second maintenance time, and the third maintenance time is maintained longer than a time of a threshold to which the same value is applied in seconds, the facilitating of the torque reserve diagnosis is confirmed.

As the exemplary embodiment of the present invention, when each of the first maintenance time, the second maintenance time, and the third maintenance time is maintained shorter than the time of the threshold, the step is switched to stopping the torque reserve diagnosis.

As the exemplary embodiment of the present invention, the performing of the second system diagnostic control includes: diagnosing the air conditioner, wherein the diagnosing the air conditioner confirms an A/C ON/OFF operation of the air conditioner, and confirms the facilitating of the torque reserve diagnosis by applying a fourth maintenance time to the operation of the air conditioner; diagnosing the transmission wherein the diagnosing the transmission confirms a shifting stage of the transmission, and switches to stopping the torque reserve diagnosis upon a D stage; and diagnosing the engine, wherein the diagnosing the engine confirms the facilitating of the torque reserve diagnosis by confirming the coolant temperature of the engine if the transmission is not in the D stage.

As the exemplary embodiment of the present invention, when the fourth maintenance time is maintained longer than a time of a threshold applied in seconds, the facilitating of the torque reserve diagnosis is confirmed.

As the exemplary embodiment of the present invention, the coolant temperature is applied with a temperature equal to or smaller than engine warm-up.

As the exemplary embodiment of the present invention, the verifying of the change in the torque reserve includes: applying a change threshold to the confirming of the change in the torque reserve; applying a fifth maintenance time to the change in the torque reserve; confirming a normality of an idle torque reserve which determines that the cold start E/M reduction system is normal, when a value of the change in the torque reserve is greater than the change threshold or the fifth maintenance time is maintained shorter than a time of the threshold; and confirming the abnormality of the idle torque reserve which determines that the cold start E/M reduction system is failed, when the fifth maintenance time is maintained longer than a time of the threshold in a state where the value of the change in the torque reserve is smaller than the change threshold.

As the exemplary embodiment of the present invention, the change threshold is applied with an angle for an increase in a retard angle.

As the exemplary embodiment of the present invention, a time of the threshold is applied in seconds.

Furthermore, a vehicle according to various exemplary embodiments of the present invention for achieving the object includes: a cold start E/M reduction system including any one or more of an electric load device, an alternator, a purge valve, an air conditioner, a transmission, and an engine; and a system diagnostic device configured for confirming a change in a torque reserve compared to a torque reserve (A) confirmed for an ignition timing upon cold start by any one of an operation of the electric load device, an operation of the alternator, an operation of the purge valve, an operation of the air conditioner, and a shift state of the transmission, and a coolant temperature state of the engine, and confirming the change in the torque reserve by confirming the failure or normality of any one the electric load device, the alternator, the purge valve, and the air conditioner to apply the confirmed result to determine whether the cold start E/M reduction system is abnormal.

As various exemplary embodiments of the present invention, the system diagnostic device includes: a controller configured for confirming the change in the torque reserve by torque reserve monitoring to determine whether the cold start E/M reduction system is abnormal; a diagnostic condition inputter for confirming and providing the torque reserve (A) to the controller; and a stop condition inputter for providing an idle torque reserve failure diagnostic stop condition to the controller such that the torque reserve monitoring is stopped.

As the exemplary embodiment of the present invention, the diagnostic condition inputter determines the torque reserve by a value obtained by subtracting a current ignition timing retarded from a maximum brake torque, and the maximum brake torque and the retard are confirmed in a torque-ignition timing line diagram.

As the exemplary embodiment of the present invention, the stop condition inputter applies any one of a rapid change section of an electric load, a brake operation section, a purge ON/OFF section, an A/C ON/OFF section, a D stage section, and a coolant temperature section to the idle torque reserve failure diagnostic stop condition.

The cold start E/M reduction system failure diagnosis applied to the vehicle according to various exemplary embodiments of the present invention implements the following operations and effects.

First, it is possible to diagnose failure of the cold start E/M reduction control system through the idle torque reserve monitoring retarded compared to the maximum brake torque (MBT). Second, it is possible to confirm the torque reserve reduction occurrence state in the P/N stage idle condition which is the section where there is no occurrence of the turning-off and the state where there is no change in the load, securing the accuracy of the system failure diagnosis. Third, the individual system failure diagnosis may be performed by interlocking the momentary reduction in the torque reserve caused upon the idle torque reserve monitoring with the operation of the cold start E/M reduction control system. Fourth, it is possible to cope with the North American strengthened OBD according to the trend in which the mandatory application of the cold start emission reduction (CSER) system failure diagnosis (e.g., North American legislation) is required. Fifth, it is possible to utilize the torque reserve function operated for compensating for the instability and the occurrence of disturbance of the components for the cold start E/M reduction, not largely causing the systemic and logical changes.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 1 is a flowchart illustrating a method for diagnosing failure of a cold start E/M reduction system according to various exemplary embodiments of the present invention.

FIG. 2A and FIG. 2B illustrate an example of a vehicle in which a system diagnosis device configured for diagnosing failure of a cold start E/M reduction system according to various exemplary embodiments of the present invention is provided.

FIG. 4A and FIG. 4B, FIG. 5 and FIG. 6 are detailed flowcharts of a torque reserve monitoring performance logic in the method for diagnosing failure of the cold start E/M reduction system according to various exemplary embodiments of the present invention.

Figure 2B:
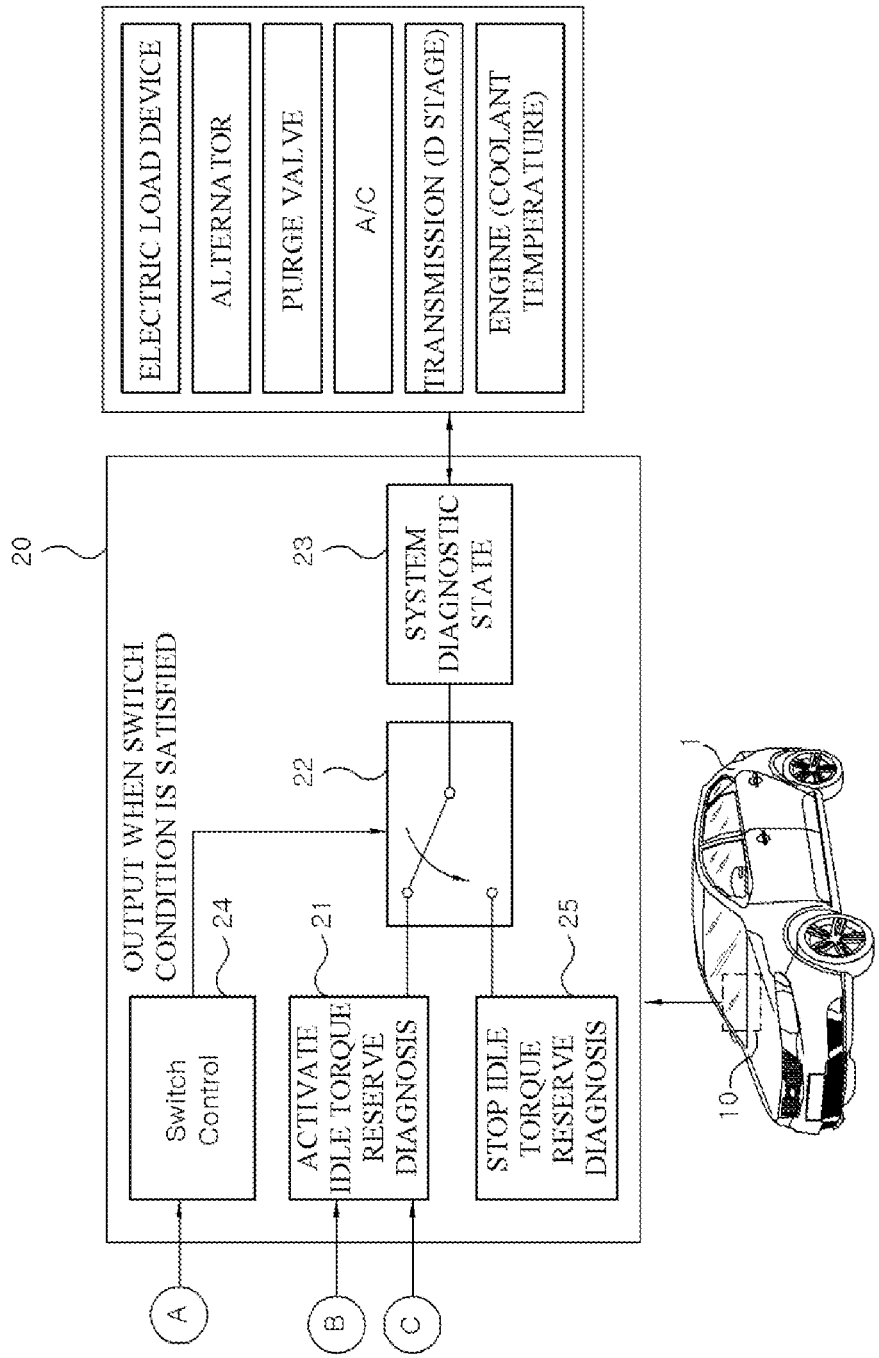

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, an exemplary various exemplary embodiments of the present invention will be described in detail with reference to the accompanying drawings, and the exemplary embodiment of the present invention may be implemented in various different forms by those skilled in the art to which various exemplary embodiments of the present invention pertains as an example and thus is not limited to the exemplary embodiment described herein.

Referring to FIG. 1, a method for diagnosing failure of a cold start E/M reduction system performs a torque reserve application control (S10 to S30) applied based on an ignition timing based on an engine RPM/an engine load upon cold start of an engine, and then performs a torque reserve monitoring control (S40) for components of a cold start E/M reduction system, implementing a system diagnosis (S50-1, S50-2) classifying whether the system is abnormal into confirming that the cold start E/M reduction system having no failure is normal (S50-1) or confirming that the cold start E/M reduction system having failure is failed (S50-2).

The torque reserve monitoring control (S40) performs a diagnosis by limiting a torque reserve diagnostic condition of a cold start emission reduction (CSER) to the idle of a P stage or an N stage, and as a result, stops the failure diagnosis in a section performing a control for preventing the turning off when confirming whether the torque reserve is rapidly changed by determining a change in the torque reserve amount upon idle to diagnose the CSER idle torque reserve, preventing the misdiagnosis for the turning-off situation causing the rapid reduction in the torque reserve.

Therefore, the method for diagnosing failure of the cold start E/M reduction system confirms the rapid reduction phenomenon of the torque reserve through the torque reserve monitoring for an operation of a torque reserve function compensating for the instability and the occurrence of disturbance of components for the cold start E/M reduction, and by use of the above, applies the occurrence of the rapid reduction in the torque reserve to determining failure of the cold start E/M reduction system.

Referring to FIG. 2A and FIG. 2B, a vehicle 1 includes a system diagnostic device 10 for individually controlling the respective components of a cold start E/M reduction system 10.

The cold start E/M reduction system 10 may include one or more of an electric load device, an alternator, a purge valve, an air conditioner, a transmission, and an engine.

As an example, the electric load device is a type of a heater such as a heat pump, a positive temperature coefficient (PTC), or an electrically heated catalyst (EHC). The alternator includes the driving for the charging of a state of charge (SOC) value of a battery. The purge valve controls the opening or closing of a purge line such that an evaporation gas of a fuel tank is supplied to a combustion chamber of the engine. The air conditioner is an air-conditioning device, the transmission performs a shift, and the engine is a power source of a vehicle as an internal combustion engine.

The system diagnostic device 10 includes a controller 20, a diagnostic condition inputter 30, and a stop condition inputter 40.

As an example, the controller 20 is operated by a central processing unit of performing the detection, computation, and determination of data for a control in conjunction with a memory in which a logic for the ignition timing measurement confirmation control (S10 to S30), the torque reserve monitoring control (S40), confirming that the cold start E/M reduction system is normal/failed (S50-1, S50-2), and the like is stored by programming.

To the present end, the controller 20 includes a diagnostic active processor 21, a switch 22, a monitoring processor 23, a switch processor 24, and a diagnostic stop processor 25. In the instant case, detailed operations of the diagnostic active processor 21, the switch 22, the monitoring processor 23, the switch processor 24, and the diagnostic stop processor 25 will be described later.

As an example, the diagnostic condition inputter 30 transmits one or more of the engine RPM, the engine load amount (e.g., relative engine load), the ignition timing, and the torque reserve to the controller 20 as input information.

To the present end, the diagnostic condition inputter 30 includes an engine condition processor 31, an ignition condition processor 32, and a torque reserve condition processor 33. In the instant case, detailed operations of the engine condition processor 31, the ignition condition processor 32, and the torque reserve condition processor 33 will be described later.

As an example, the stop condition inputter 40 generates and transfers an idle torque reserve failure diagnostic stop signal to the switch processor 24. In the instant case, a detailed situation for a condition of generating the idle torque reserve failure diagnostic stop signal of the stop condition inputter 40 will be described later.

Hereinafter, the method for diagnosing failure of the cold start E/M reduction system illustrated in FIG. 1 will be described in detail with reference to FIGS. 2A and 2B to 6. In the instant case, a control subject is the controller 20 of the system diagnostic device 10, and a control object is one or more of the electric load device, the alternator, the purge valve, the air conditioner, the transmission, and the engine of the cold start E/M reduction system 10.

Referring to FIG. 1, the controller 20 starts the torque reserve application control (S10 to S30) upon cold start of the engine, and the torque reserve application control (S10 to S30) includes reading the engine information (S10), confirming the ignition timing (S20), and confirming the torque reserve (S30).

Referring to FIG. 2A and FIG. 2B, the controller 20 confirms information generated by the engine condition processor 31, the ignition condition processor 32, and the torque reserve condition processor 33 of the diagnostic condition inputter 30 through the diagnostic active processor 21.

Therefore, the controller 20 performs the reading of the engine information (S10) using, as the engine information, the engine RPM and the engine load amount (e.g., relative engine load) confirmed by the engine condition processor 31 of the diagnostic condition inputter 30 through the diagnostic active processor 21. Furthermore, the controller 20 performs the confirming of the torque reserve for each ignition timing (S20, S30) by reading a torque reserve (A) confirmed by the torque reserve condition processor 33 at the ignition timing of the ignition condition processor 32 of the diagnostic condition inputter 30 through the diagnostic active processor 21.

Figure 3:
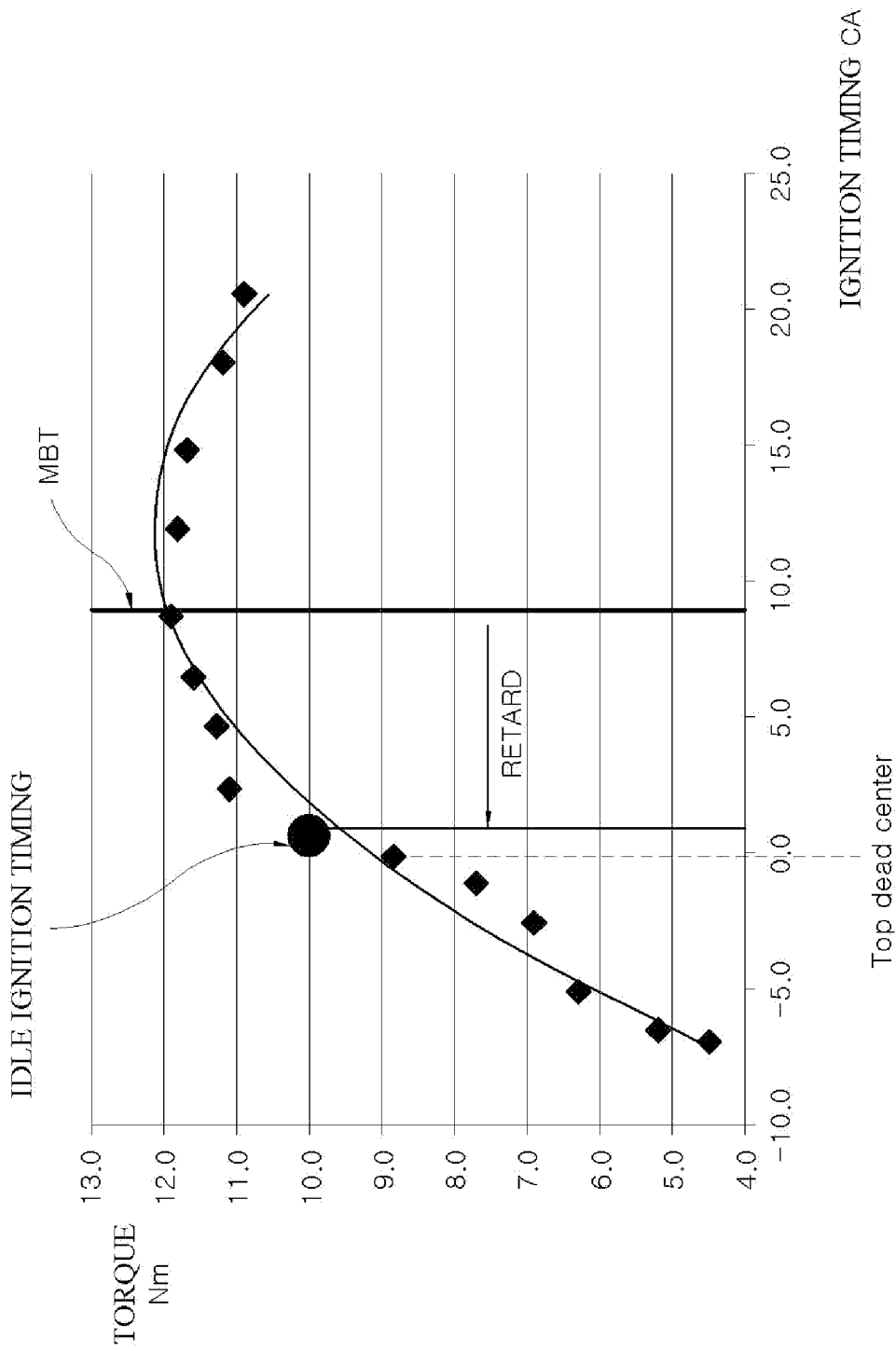
FIG. 3 illustrates an example of a torque-ignition timing line diagram representing that the ignition timing upon idle according to various exemplary embodiments of the present invention is retarded compared to a maximum brake torque (MBT).

Referring to FIG. 3, the torque-ignition timing line diagram upon idle represents that the torque reserve is retarded compared to a maximum brake torque (MBT) in the idle state of the engine.

Therefore, it may be seen that the torque reserve (A) applied to the torque reserve condition processor 33 is determined as follows using the idle ignition timing retarded from the MBT as a current ignition timing.

Torque reserve (A)=MBT−current ignition timing

Subsequently, the controller 20 performs the torque reserve monitoring control (S40), and the torque reserve monitoring control (S40) confirms whether the value of the torque reserve (A) (S30) is changed (or rapidly changed) by operation of any one of the electric load device, the alternator, the purge valve, the air conditioner, the transmission, and the engine of the cold start E/M reduction system 10.

Finally, the controller 20 terminates the torque reserve monitoring control (S40) through the confirming that the cold start E/M reduction system is normal (S50-1) if the torque reserve (A) (S30) is not changed (or not rapidly changed i.e., more than a predetermined change rate) in the operation state of the cold start E/M reduction system 10 or terminates the torque reserve monitoring control (S40) through the confirming that the cold start E/M reduction system is failed (S50-2) if the torque reserve (A) (S30) is changed (or rapidly changed).

The controller 20 outputs a system failure or fault signal with respect to the confirming that the cold start E/M reduction system is failed (S50-2), and turns on a warning lamp provided on a driver seat cluster by the system failure or fault signal to be recognizable by a driver.

Meanwhile, FIG. 4A and FIG. 4B to 6 illustrate detailed flowcharts of the torque reserve monitoring control (S40) performed by the controller 20.

Figure 4A:
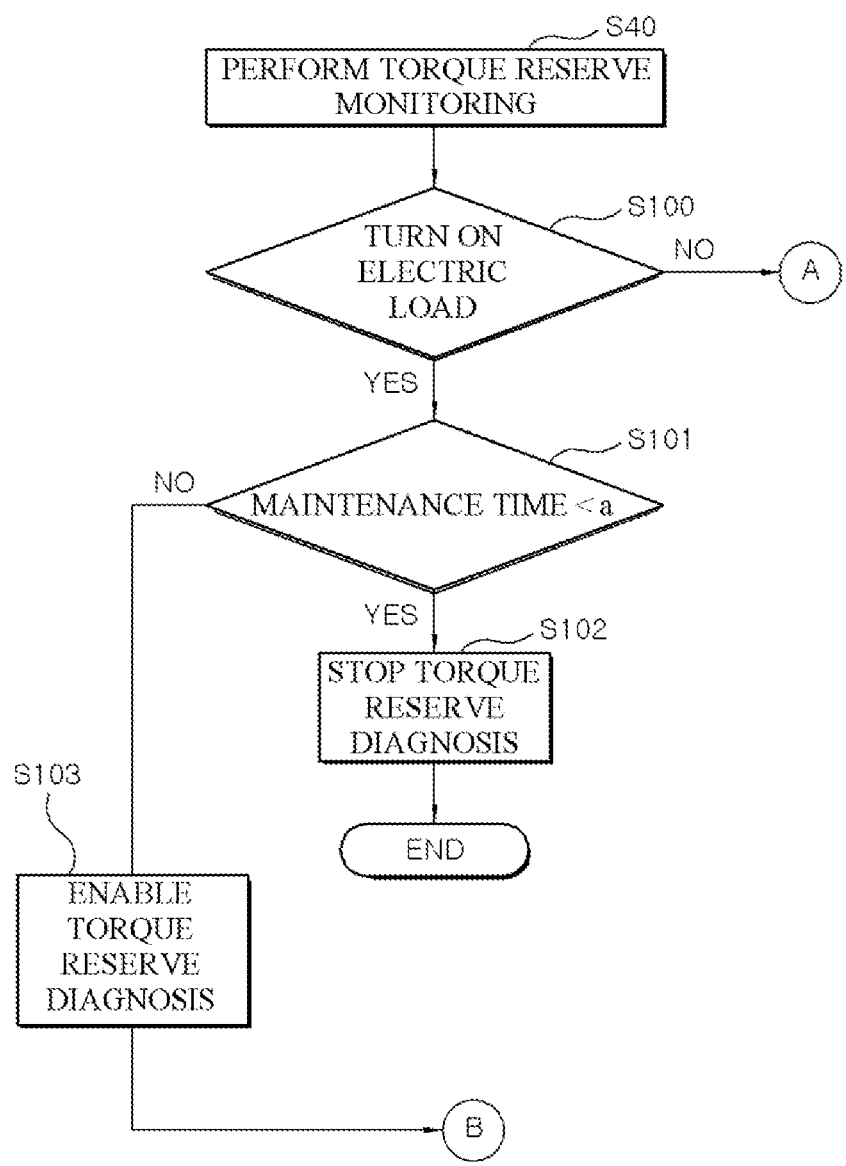
Figure 5:
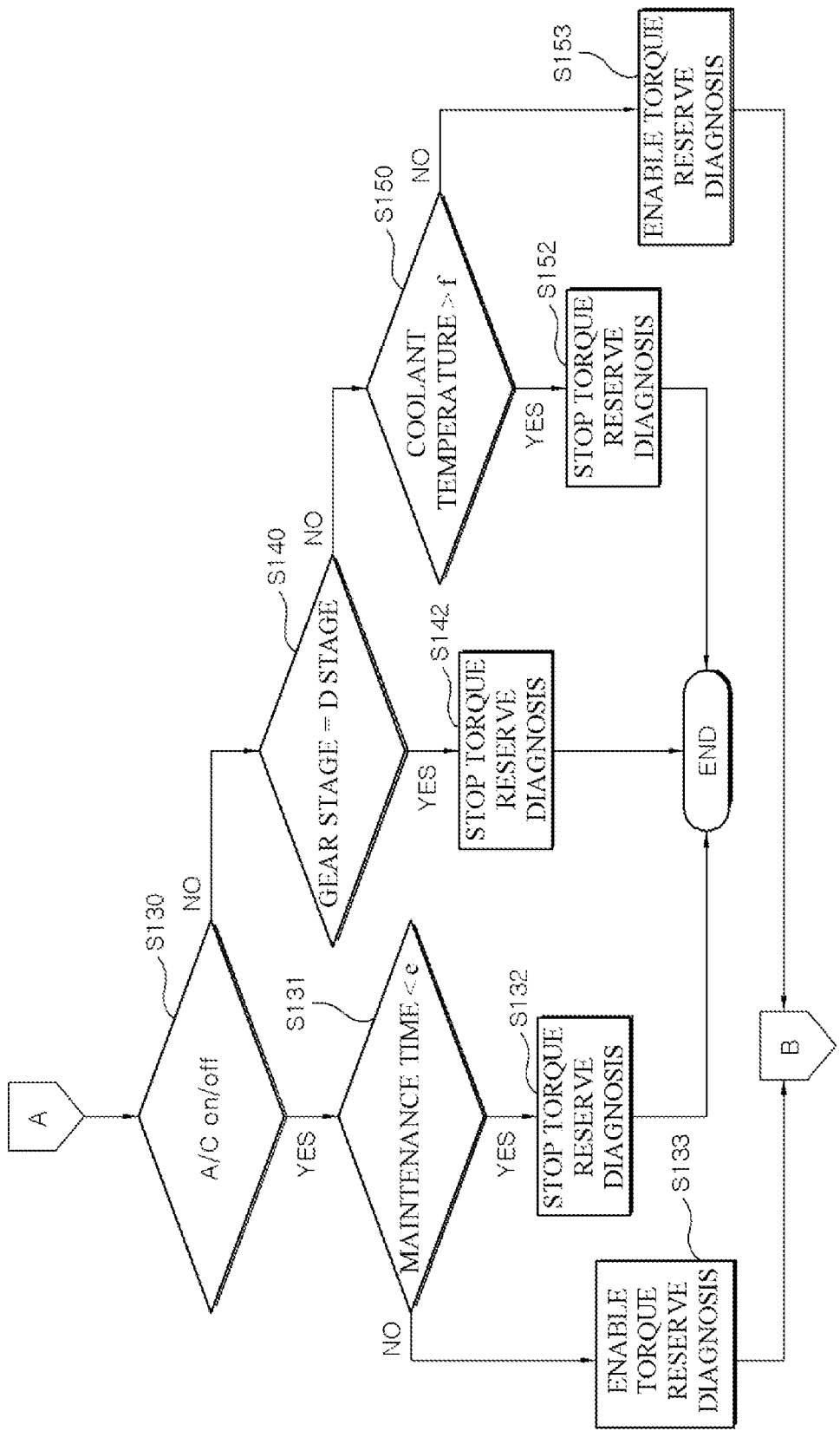
Figure 6:
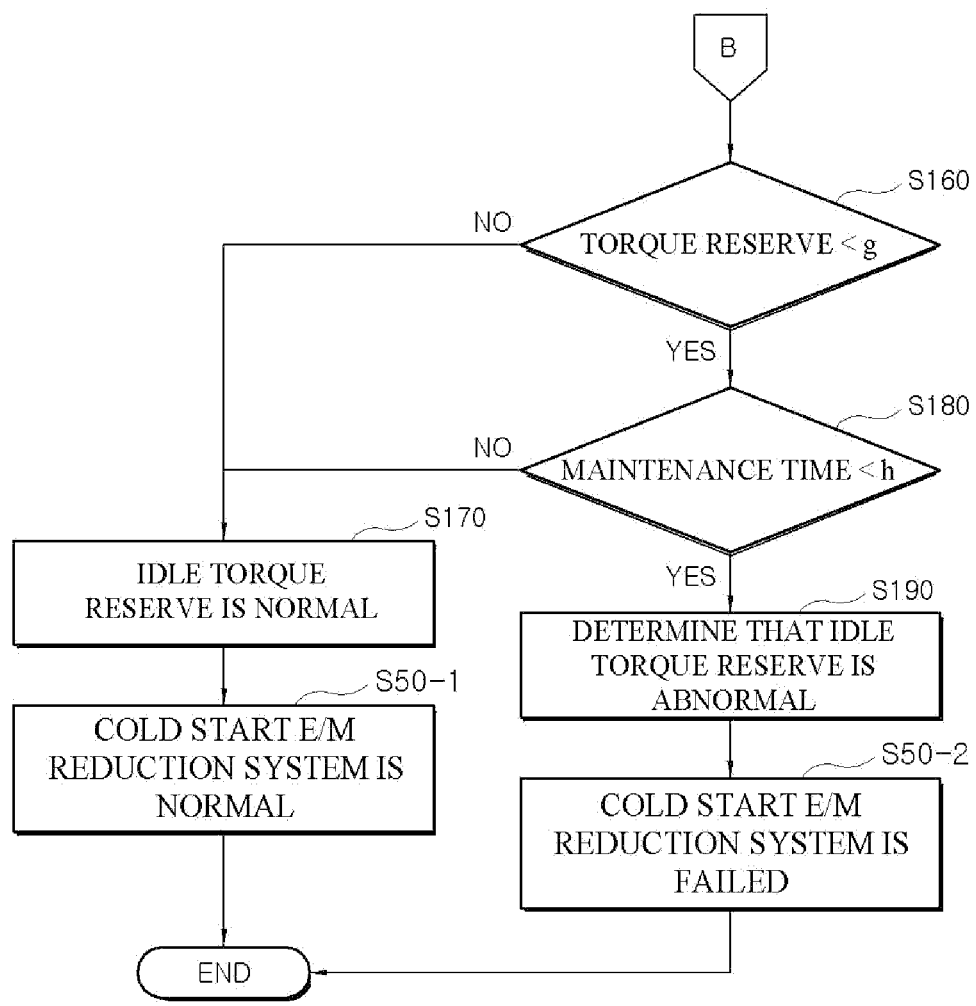

As illustrated, the controller 20 performs the torque reserve monitoring control (S40) by a first system diagnostic control classified into diagnosing the electric load device (S100 to S103), diagnosing the alternator (S110 to S113), and diagnosing the purge valve (S120 to S123) illustrated in FIGS. 4A and B, a second system diagnostic control classified into diagnosing the air conditioner (S130 to S133), diagnosing the transmission (S140, S142), and diagnosing the engine (S150, S152, S153) illustrated in FIG. 5, and a system diagnostic completion control using verifying the change in the torque reserve (S160 to S190) illustrated in FIG. 6.

Referring to FIG. 2A and FIG. 2B, operations implemented by the controller 20, the diagnostic condition inputter 30, and the stop condition inputter 40 are as follows.

As an example, the diagnostic active processor 21 activates the idle torque reserve diagnosis by reading the input information related to the diagnostic condition inputter 30. The switch 22 performs a switching operation to be connected to the diagnostic active processor 21 or connected to the diagnostic stop processor 25 according to a signal of the switch processor 24.

As an example, the monitoring processor 23 confirms the operation states of the electric load device, the alternator, the purge valve, the air conditioner, the transmission, and the engine configuring the cold start E/M reduction system 10, and allows the switch 22 to be switched to the diagnostic active processor 21 or the diagnostic stop processor 25 by a normal signal or a failure signal based on the above result.

As an example, the switch processor 24 is activated by the idle torque reserve failure diagnostic stop signal of the stop condition inputter 40, and allows the switch 22 to be switched to the diagnostic stop processor 25 by the idle torque reserve failure diagnostic stop signal in the state of the diagnostic active processor 21. The diagnostic stop processor 25 stops the idle torque reserve diagnosis when contacting with the switch 22.

As an example, the engine condition processor 31 transmits the engine RPM and the engine load amount (e.g., relative engine load) to the diagnostic active processor 21 as the input information, the ignition condition processor 32 transmits the ignition timing to the diagnostic active processor 21 as the input information, and the torque reserve condition processor 33 transmits the torque reserve to the diagnostic active processor 21 as the input information. In the instant case, the torque reserve is a difference value between the MBT and the current ignition timing.

As an example, the stop condition inputter 40 sets a condition of generating the idle torque reserve failure diagnosis stop signal transferred to the switch processor 24 as below to generate a signal of stopping the idle torque reserve failure diagnosis when the condition is satisfied.

[Below]

(1) A rapid change section of the electric load
(2) A brake operation section for stopping the vehicle
(3) Purge valve ON/OFF section
(4) A/C ON/OFF section of the air conditioner
(5) D stage section
(6) A section in which the coolant temperature of the engine is 60° C. or more upon start of the engine Referring to FIGS. 4A and 4B, the controller 20 performs the first system diagnostic control by the diagnosing of the electric load device (S100 to S103)→the diagnosing of the alternator (S110 to S113)→the diagnosing of the purge valve (S120 to S123). However, since the proceeding order does not affect the system diagnosis, the proceeding order may be changed, as necessary.

The diagnosing of the electric load device (S100 to S103) includes turning on the electric load device (S100), confirming a maintenance time in the operation state of the electric load device (S101), stopping the torque reserve diagnosis (S102), and facilitating the torque reserve diagnosis (S103).

As an example, the confirming of the maintenance time (S101) applies the following electric load device state confirmation formula in the operation state of the electric load device by a control signal of the controller 20 or an operation of a switch or a button (S100).

Electric load device state confirmation formula: first maintenance time<a?, where the "first maintenance time" refers to a time at which a device driving time of the electric load device according to an ON signal output from the monitoring processor 23 of the controller 20 to the cold start E/M reduction system 10 is confirmed by the monitoring processor 23, and the "a" refers to a driving time threshold of the electric load device applied to the electric load device upon cold start and applies about 2 seconds.

As a result, in the "first maintenance time<a", the controller 20 switches to the stopping of the torque reserve diagnosis (S102) if the first maintenance time is maintained shorter than 2 seconds and thus terminates the logic execution, whereas the controller 20 enters the facilitating of the torque reserve diagnosis (S103) if the first maintenance time is maintained longer than 2 seconds and thus proceeds to performing a fourth system operation diagnosis (S130 to S133).

The diagnosing of the alternator (S110 to S113) includes confirming an alternator excitation current change amount when the electric load device is not applied (S110), confirming the maintenance time in the excitation current change state of the alternator (S111), stopping the torque reserve diagnosis (S112), and facilitating the torque reserve diagnosis (S113).

As an example, the confirming of the alternator excitation current change amount (S110) applies an alternator current change formula, and the confirming of the maintenance time (S111) applies an alternator state confirmation formula.

Alternator current change formula: alternator excitation current change amount>b?

Alternator state confirmation formula: second maintenance time<c?

Here the "alternator excitation current change amount" refers to a change value at which the excitation current change amount generated by the alternator upon cold start is confirmed by the monitoring processor 23, the "b" refers to an excitation current change threshold applied to the alternator and applies about 40%/0.1 s, the "second maintenance time" refers to a maintenance time of the alternator excitation current change amount confirmed by the monitoring processor 23 of the controller 20, and the "c" refers to an excitation current change amount maintenance time threshold applied to the alternator and applies about 2 seconds.

As a result, in the "alternator excitation current change amount>b", the controller 20 switches to performing a third system operation diagnosis (S120 to S123) if the alternator excitation current change amount is smaller than 40%/0.1 s, whereas the controller 20 enters the confirming of the maintenance time (S111) if the alternator excitation current change amount is greater than 40%/0.1 s.

Subsequently, in the "second maintenance time<c", the controller 20 switches to the stopping of the torque reserve diagnosis (S112) if the second maintenance time is maintained shorter than 2 seconds and thus terminates the logic execution, whereas the controller 20 enters the facilitating of the torque reserve diagnosis (S113) if the second maintenance time is maintained longer than 2 seconds and thus proceeds to the performing of the fourth system operation diagnosis (S130 to S133).

The diagnosing of the purge valve (S120 to S123) includes turning on (or turning off) the purge valve (S120), confirming the maintenance time in the state of turning on (or turning off) the purge valve (S121), stopping the torque reserve diagnosis (S122), and facilitating the torque reserve diagnosis (S123).

As an example, the confirming of the maintenance time (S121) applies the following purge valve state confirmation formula in the operation state of the purge valve by a control signal of the controller 20 or an operation of a switch or a button (S120).

Purge valve state confirmation formula: third maintenance time<d?

Here the "third maintenance time" refers to a time at which a valve driving time of the purge valve according to the ON signal output from the monitoring processor 23 of the controller 20 to the cold start E/M reduction system 10 is confirmed by the monitoring processor 23, and the "d" refers to a purge valve driving time threshold applied to the purge valve upon cold start and applies about 2 seconds.

As a result, in the "third maintenance time<d", the controller 20 switches to the stopping of the torque reserve diagnosis (S122) if the third maintenance time is maintained shorter than 2 seconds and thus the logic execution is terminated, whereas the controller 20 enters the facilitating of the torque reserve diagnosis (S123) if the third maintenance time is maintained longer than 2 seconds and thus proceeds to the performing of the fourth system operation diagnosis (S130 to S133).

Referring to FIG. 5, the controller 20 performs the second system operation diagnostic control by the diagnosing of the air conditioner (S130 to S133)→the diagnosing of the transmission (S140, S142)→the diagnosing of the engine (S150, S152, S153). However, since the proceeding order does not affect the system diagnosis, the proceeding order may be changed, as necessary.

The diagnosing of the air conditioner (S130 to S133) includes confirming the A/C ON (or OFF) of the air conditioner (S130), confirming the maintenance time in the operation (or stop) state of the air conditioner upon A/C ON (or OFF) (S131), stopping the torque reserve diagnosis (S132), and facilitating the torque reserve diagnosis (S133).

As an example, the confirming of the maintenance time (S131) applies the following air conditioner state confirmation formula in the operation state (A/C ON) (or stop A/C OFF) of the air conditioner by a control signal of the controller 20 or an operation of a switch or a button (S130).

Air conditioner state confirmation formula: fourth maintenance time<e?

Here the "fourth maintenance time" refers to a time at which an operation (or stop) time of the air conditioner according to the ON signal (or OFF signal) output from the monitoring processor 23 of the controller 20 to the cold start E/M reduction system 10 is confirmed by the monitoring processor 23, and the "e" refers to an air conditioner driving time threshold applied to the air conditioner upon cold start and applies about 2 seconds.

As a result, in the "fourth maintenance time<e", the controller 20 switches to the stopping of the torque reserve diagnosis (S132) if the fourth maintenance time is maintained shorter than 2 seconds and thus terminates the logic execution, whereas the controller 20 enters the facilitating of the torque reserve diagnosis (S133) if the fourth maintenance time is maintained longer than 2 seconds and thus proceeds to verifying a change in the torque reserve (S160 to S190).

The diagnosing of the transmission (S140, S142) includes confirming a shifting stage of the transmission when the air conditioner is not applied (S140) and stopping the torque reserve diagnosis in a specific shifting stage (S142).

As an example, the confirming of the shifting stage of the transmission (S140) applies a shifting stage confirmation formula of the transmission.

Shifting stage confirmation formula: shifting stage=D stage?

Here the "shifting stage" refers to a shifting stage of the transmission (or shift lever signal) confirmed by the monitoring processor 23 upon cold start, and the "D stage" refers to a D (Drive) state of the shifting stages.

As a result, in the "shifting stage=D stage", the controller 20 switches to the stopping of the torque reserve diagnosis (S142) if the shifting stage is confirmed as the D stage and thus terminates the logic execution.

The diagnosing of the engine (S150, S152, S153) includes confirming a coolant temperature of the engine according to the cold start in the shifting stages other than the D stage (S150), stopping the torque reserve diagnosis (S152), and facilitating the torque reserve diagnosis (S153).

As an example, the confirming of the coolant temperature (S150) applies a coolant temperature confirmation formula.

Coolant temperature confirmation formula: coolant temperature>f?

Here the "coolant temperature" refers to a coolant temperature of the engine confirmed by the monitoring processor 23 upon cold start, and the "f" refers to a coolant temperature threshold applied to the coolant temperature of the engine upon cold start and applies about 60° C. by applying the temperature equal to or smaller than engine warm-up.

As a result, in the "coolant temperature>f", the controller 20 switches to the stopping of the torque reserve diagnosis (S152) since if the coolant temperature is greater than 60° C., it is out of the cold start condition and thus terminates the logic execution, whereas the controller 20 enters the facilitating of the torque reserve diagnosis (S153) if the coolant temperature is lower than 60° C. and thus proceeds to the verifying of the change in the torque reserve (S160 to S190).

Referring to FIG. 6, the verifying of the torque reserve change (S160 to S190) includes applying a torque reserve change value (S160), confirming that an idle torque reserve is normal (S170), applying the maintenance time of the torque reserve change value (S180), and confirming that the idle torque reserve is abnormal (S190).

As an example, the applying of the torque reserve change value (S160) applies a torque reserve verification formula, and the applying of the maintenance time (S180) applies a system state confirmation formula.

Torque reserve verification formula: torque reserve change value<g?

System state confirmation formula: fifth maintenance time<h?

Here the "torque reserve change value" refers to a retard angle change value confirmed by the torque reserve condition processor 33 of the controller 20 through the ignition condition processor 32 in comparison with the torque reserve (A), the "g" refers to a change threshold and applies about 1° to reflect a change in the angle for an increase in the retard angle, and the "fifth maintenance time" refers to a retard angle confirmed by the torque reserve condition processor 33 of the controller 20 through the ignition condition processor 32.

As a result, the controller 20 diagnoses that the cold start E/M reduction system is normal (S50-1) by the confirming that the idle torque reserve is normal (S170) if the torque reserve change value is a value greater than 1° in the "torque reserve change value<g", or if the fifth maintenance time is maintained longer than 2 seconds in the "fifth maintenance time<h".

On the other hand, the controller 20 diagnoses that the cold start E/M reduction system is failed (S50-2) by the confirming that the idle torque reserve is abnormal (S190) if the torque reserve change value is a value smaller than 1° in the "torque reserve change value<g", or if the fifth maintenance time is maintained shorter than 2 seconds in the "fifth maintenance time<h".

As described above, the method for diagnosing failure of the cold start E/M reduction system utilizing the system diagnostic device 10 applied to the vehicle 1 according to the exemplary embodiment of the present invention confirms the change in the torque reserve compared to the torque reserve (A) confirmed for the ignition timing upon cold start by any one of the operation of the electric load device, the operation of the alternator, the operation of the purge valve, the operation of the air conditioner, the shift state of the transmission, and the coolant temperature state of the engine configuring the cold start E/M reduction system 10, and confirms the change in the torque reserve which confirms whether any one of the electric load device, the alternator, the purge valve, and the air conditioner is normal or failed to apply the confirmed result to determine whether the cold start E/M reduction system is abnormal, securing failure diagnosis accuracy for the components for the cold start E/M reduction, and limits the torque reserve diagnostic condition to the state where there is no occurrence of the turning-off and thus there is no change in the load, preventing the misdiagnosis due to the turning-off causing the rapid reduction in the torque reserve.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The controller according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors.

The control device may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a controller, and the controller may be configured by a plurality of controllers, or an integrated single controller.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method for diagnosing failure of a cold start emission (E/M) reduction system, the method comprising:
    confirming, by a controller, a torque reserve for an ignition timing upon cold start of an engine; and
    performing, by the controller, a torque reserve monitoring control which confirms a change in the torque reserve compared to the torque reserve by one of an operation of an electric load device, an operation of an alternator, an operation of a purge valve, an operation of an air conditioner, a shift state of a transmission, and a coolant temperature state of an engine, and confirms whether at least one of the electric load device, the alternator, the purge valve, and the air conditioner is abnormal using the change in the torque reserve.

2. The method of claim 1,
    wherein the torque reserve is an idle torque ignition timing retarded compared to a maximum brake torque (MBT).

3. The method of claim 1,
    wherein the confirming of the torque reserve for the ignition timing is performed by confirming an engine revolutions per minute (RPM) and an engine load upon the cold start.

4. The method of claim 1, wherein the performing of the torque reserve monitoring control includes:
    performing a first system diagnostic control, wherein the performing the first system diagnostic control confirms facilitating a torque reserve diagnosis by operation of one of the electric load device, the alternator, and the purge valve;
    performing a second system diagnostic control, wherein the performing the second system diagnostic control confirms facilitating the torque reserve diagnosis by applying one of an operation of the air conditioner or the shift state and the coolant temperature state; and
    verifying a change in the torque reserve, wherein the verifying the change in the torque reserve confirms the change in the torque reserve by the facilitating of the torque reserve diagnosis, and confirms presence or absence of the abnormality by normality of the cold start E/M reduction system or the failure of the cold start E/M reduction system.

5. The method of claim 4, wherein the performing of the first system diagnostic control includes:
    diagnosing the electric load device, wherein the diagnosing the electric load device confirms the facilitating of the torque reserve diagnosis by operating the electric load device, and applying a first maintenance time to the operation of the electric load device;
    diagnosing the alternator, wherein the diagnosing the alternator confirms an excitation current change amount generated by the alternator, and confirms the facilitating of the torque reserve diagnosis by applying a second maintenance time to the excitation current change amount; and
    diagnosing the purge valve, wherein the diagnosing the purge valve confirms the facilitating of the torque reserve diagnosis by operating the purge valve, and applying a third maintenance time to the operation of the purge valve.

6. The method of claim 5,
    wherein when each of the first maintenance time, the second maintenance time, and the third maintenance time is maintained longer than a first threshold time period, a second threshold time period and a third threshold time period, respectively, the facilitating of the torque reserve diagnosis is confirmed.

7. The method of claim 6,
    wherein the first threshold time period, the second threshold time period and the third threshold time period are applied with a same value in seconds.

8. The method of claim 6,
    wherein when each of the first maintenance time, the second maintenance time, and the third maintenance time is maintained shorter than the first threshold time period, the second threshold time period and the third threshold time period, respectively, the controller is configured to stop the torque reserve diagnosis.

9. The method of claim 4,
    wherein the performing of the second system diagnostic control includes:
    diagnosing the air conditioner, wherein the diagnosing the air conditioner confirms an A/C ON/OFF operation of the air conditioner, and confirms the facilitating of the torque reserve diagnosis by applying a fourth maintenance time to the operation of the air conditioner;
    diagnosing the transmission wherein the diagnosing the transmission confirms a shifting stage of the transmission, and switches to stopping the torque reserve diagnosis upon a D stage; and
    diagnosing the engine, wherein the diagnosing the engine confirms the facilitating of the torque reserve diagnosis by confirming a coolant temperature of the engine when the transmission is not in the D stage.

10. The method of claim 9,
    wherein when the fourth maintenance time is maintained longer than a fourth threshold time period, the facilitating of the torque reserve diagnosis is confirmed.

11. The method of claim 10,
    wherein the fourth threshold time period is applied in seconds.

12. The method of claim 9,
    wherein the coolant temperature is applied with a temperature equal to or lower than a predetermined engine warm-up temperature.

13. The method of claim 4, wherein the verifying of the change in the torque reserve includes:
    applying a change threshold to the confirming of the change in the torque reserve;
    applying a fifth maintenance time to the change in the torque reserve;
    confirming a normality of an idle torque reserve, wherein the confirming the normality of the idle torque reserve determines that the cold start E/M reduction system is normal, when a value of the change in the torque reserve is greater than the change threshold or the fifth maintenance time is maintained shorter than a fifth threshold time period; and confirming an abnormality of the idle torque reserve, wherein the confirming the abnormality of the idle torque reserve determines that the cold start E/M reduction system is failed, when the fifth maintenance time is maintained longer than the fifth threshold time period in a state where the value of the change in the torque reserve is smaller than the change threshold.

14. The method of claim 13,
wherein the change threshold is applied with an angle for an increase in a retard angle.

15. The method of claim 13,
wherein the fifth threshold time period is applied in seconds.

16. A vehicle comprising:
a cold start emission (E/M) reduction system including one or more of an electric load device, an alternator, a purge valve, an air conditioner, a transmission, and an engine; and
a system diagnostic device configured for confirming a change in a torque reserve compared to a torque reserve confirmed for an ignition timing upon cold start by one of an operation of the electric load device, an operation of the alternator, an operation of the purge valve, an operation of the air conditioner, and a shift state of the transmission, and a coolant temperature state of the engine, and confirming failure or normality of at least one of the electric load device, the alternator, the purge valve, and the air conditioner using the change in the torque reserve to apply the confirmed result to determine whether the cold start E/M reduction system is abnormal.

17. The vehicle of claim 16, wherein the system diagnostic device includes:
a controller configured for confirming the change in the torque reserve by torque reserve monitoring to determine whether the cold start E/M reduction system is abnormal;
a diagnostic condition inputter for confirming and providing the torque reserve to the controller; and
a stop condition inputter for providing an idle torque reserve failure diagnostic stop condition to the controller so that the torque reserve monitoring is stopped.

18. The vehicle of claim 17,
wherein the diagnostic condition inputter is configured to determine the torque reserve by a value obtained by subtracting a current ignition timing retarded, from a maximum brake torque.

19. The vehicle of claim 18,
wherein the maximum brake torque and the current ignition timing retarded are confirmed in a torque-ignition timing line diagram.

20. The vehicle of claim 17,
wherein the stop condition inputter applies one of a rapid change section of an electric load, a brake operation section, a purge ON/OFF section, an A/C ON/OFF section, a D stage section, and a coolant temperature section to the idle torque reserve failure diagnostic stop condition.

* * * * *